US012424403B2

(12) United States Patent
Schaper et al.

(10) Patent No.: US 12,424,403 B2
(45) Date of Patent: Sep. 23, 2025

(54) METHOD FOR ACTUATING AN ELECTROMECHANICAL SWITCHING ELEMENT

(71) Applicant: Phoenix Contact GmbH & Co. KG, Blomberg (DE)

(72) Inventors: Elmar Schaper, Lügde (DE); Fabian Winkel, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 19/110,150

(22) PCT Filed: Sep. 4, 2023

(86) PCT No.: PCT/EP2023/074113
§ 371 (c)(1),
(2) Date: Mar. 10, 2025

(87) PCT Pub. No.: WO2024/056418
PCT Pub. Date: Mar. 21, 2024

(65) Prior Publication Data

US 2025/0259812 A1 Aug. 14, 2025

(30) Foreign Application Priority Data

Sep. 12, 2022 (BE) .................................. 2022/5719

(51) Int. Cl.
*H01H 47/00* (2006.01)

(52) U.S. Cl.
CPC ................................ *H01H 47/002* (2013.01)

(58) Field of Classification Search
CPC .................................................. H01H 47/002
USPC ........................................................ 361/170
See application file for complete search history.

(56) References Cited

U.S. PATENT DOCUMENTS 4,937,544 A 6/1990 Mueller
6,430,021 B1 8/2002 Tokunaga
6,765,316 B1 * 7/2004 Elsner .................... H01H 9/563 307/130
10,366,852 B2 7/2019 Birner et al.
10,483,052 B2 11/2019 Pöppel et al.
(Continued)

FOREIGN PATENT DOCUMENTS

CN 106463307 A 2/2017
DE 102010011394 A1 9/2011
(Continued)

*Primary Examiner* — Dharti H Patel
(74) *Attorney, Agent, or Firm* — Leydig, Voit & Mayer, Ltd.

(57) ABSTRACT

A method for actuating an electromechanical switching element including a plurality of contacts, a coil with an iron core, and an armature includes: in the event that a predefined condition is fulfilled, in a switch-off process pulsing on and off or in the switch-on process pulsing off and on of the switching element is carried out repeatedly at a predefined time within an overtravel range such that a coil current flowing into the coil oscillates between a predefined maximum value and a minimum value so that the armature moves within the overtravel range and the plurality of contacts thereby rub against each other without becoming detached from each other. The minimum value is defined as a current value at a time at which the armature begins to detach from the iron core.

7 Claims, 2 Drawing Sheets

(56) References Cited

U.S. PATENT DOCUMENTS

| | | | | |
|---|---|---|---|---|
| 11,651,918 | B2 * | 5/2023 | Carlson | H01H 47/002<br>361/157 |
| 11,721,505 | B2 * | 8/2023 | Chapel | H01H 50/60<br>335/185 |
| 11,774,501 | B2 | 10/2023 | Scholz et al. | |
| 2010/0265629 | A1 * | 10/2010 | Beckerman | H01H 47/22<br>361/160 |
| 2022/0028642 | A1 * | 1/2022 | Chapel | H01H 50/34 |
| 2023/0296674 | A1 | 9/2023 | Scholz et al. | |
| 2023/0343533 | A1 * | 10/2023 | Elmiger | G01R 31/3278 |
| 2023/0415580 | A1 * | 12/2023 | Wang | H01H 83/10 |
| 2024/0222054 | A1 * | 7/2024 | Chapel | H01H 47/02 |

FOREIGN PATENT DOCUMENTS

| | | | | |
|---|---|---|---|---|
| DE | 102014211400 | A1 | 12/2015 | |
| DE | 102018114425 | A1 | 12/2019 | |
| EP | 0326116 | A1 | 8/1989 | |
| EP | 3185269 | B1 | 4/2019 | |
| WO | WO-2006134452 | A1 * | 12/2006 | H01H 9/44 |
| WO | WO-2020031068 | A1 * | 2/2020 | H01H 1/06 |
| WO | WO 2020115313 | A1 | 6/2020 | |
| WO | WO 2021094418 | A1 | 5/2021 | |
| WO | WO-2022229274 | A1 * | 11/2022 | G01R 31/3274 |
| WO | WO-2025034305 | A1 * | 2/2025 | H01H 50/14 |

* cited by examiner

METHOD FOR ACTUATING AN ELECTROMECHANICAL SWITCHING ELEMENT

CROSS-REFERENCE TO PRIOR APPLICATIONS

This application is a U.S. National Phase Application under 35 U.S.C. § 371 of International Application Number PCT/EP2023/074113, filed on Sep. 4, 2023, and claims benefit to Belgian Patent Application No. BE 2022/5719, filed on Sep. 12, 2022. The International Application was published in German on Mar. 21, 2024 as WO 2024/056418 A1 under PCT Article 21(2).

FIELD

This disclosure relates to a method for actuating an electromechanical switching element, and to a universal component.

BACKGROUND

When switching electromechanical switching elements such as relays two error patterns can be obtained. In one case, a relay cannot contact by a switch-on process, in another case the current flow via the contacts cannot be interrupted by a switch-off process. The reasons for these error patterns are manifold, wherein among other things mechanical interlocking, oxide layers and welding together of the contacts are conceivable. A majority of the reasons, however, is reversible, i.e. when the contacts e.g. once were mechanically interlocked, they nevertheless can be detached again and the relay can be utilized further for many thousands of switching cycles. Thus, it is possible to correct a faulty switching state of a relay by renewed actuation.

In DE 10 2014 211 400 A1 for example an at least one-time opening and closing of the contactor is effected when the contacts of the contactor are contacting with a contact resistance which does not lie below a defined value.

In EP 3 185 269 B1 a superposition of the operating current with an electrical waveform is effected. The method is applicable only for a switch-off process.

What is known are measures such as a repetition of the switching operation, and an application of a vibration to the contacts. The required measuring technique for the detection of contact states also is known, e.g. from DE 10 2018 114 425 A1 or WO 2021/94418 A1.

However, the known methods still are in need of improvement in order to prevent failures of switching elements or to delay a failure.

SUMMARY

In an embodiment, the present invention provides a method for actuating an electromechanical switching element including a plurality of contacts, a coil with an iron core, and an armature, the method comprising: in the event that a predefined condition is fulfilled, in a switch-off process pulsing on and off or in the switch-on process pulsing off and on of the switching element is carried out repeatedly at a predefined time within an overtravel range such that a coil current flowing into the coil oscillates between a predefined maximum value and a minimum value so that the armature moves within the overtravel range and the plurality of contacts thereby rub against each other without becoming detached from each other, wherein the minimum value is defined as a current value at a time at which the armature begins to detach from the iron core.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
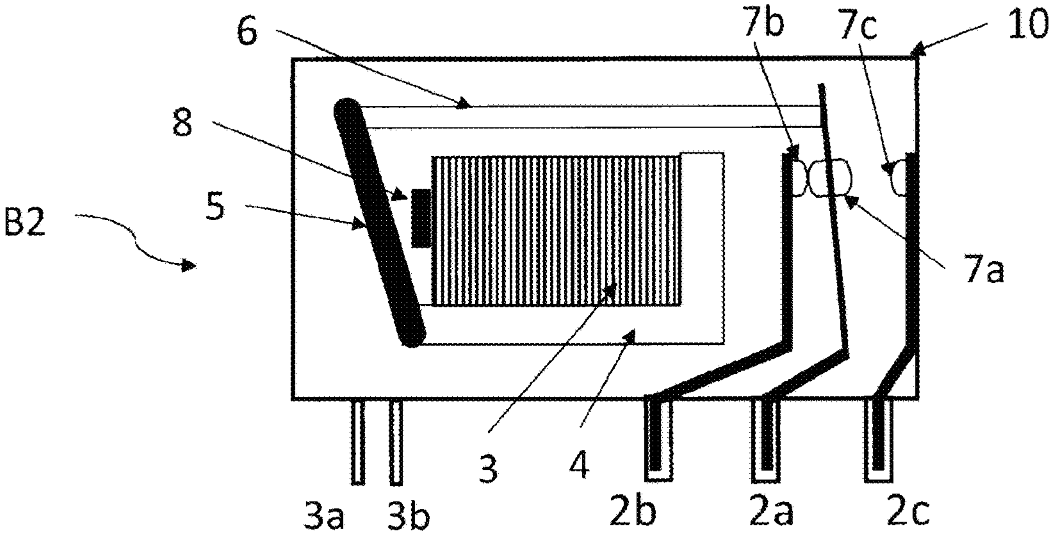
FIGS. 1-3 show views of an electromechanical switching element in different switching states according to the prior art.

In an embodiment, the present invention provides a method for actuating an electromechanical switching element, by which gluing contact elements can be avoided or can be detached again.

In an embodiment, the present invention provides a method for actuating an electromechanical switching element and a universal component as described herein.

There is proposed a method for actuating an electromechanical switching element, at least including several contacts, a coil with an iron core and an armature, wherein in the event that a predefined condition is fulfilled, pulsing on and off in the switch-off process or pulsing off and on of the switching element in the switch-on process is repeatedly carried out at a predefined point in time within an overtravel range in such a way that the coil current flowing into the coil oscillates between a predefined maximum value and a minimum value so that the armature moves within the overtravel range and the contacts thereby rub against each other without becoming detached from each other, wherein the minimum value is defined as the current value at the point in time at which the armature begins to detach from the iron core.

In another embodiment it is provided that the predefined condition is a detected error state in which the contacts do not contact each other at switch-on or do not become detached at switch-off, or wherein the predefined condition is a detection of a deterioration of the contact quality of the contacts.

In another embodiment it is provided that the switch-on duration or the switch-off duration is chosen so long until the coil current has reached the value which it had at a predefined point in time after switch-off or switch-on.

In another embodiment it is provided that for each electromechanical switching element the overtravel range is determined continuously during the use, and in the event that the same changes during the service life the predefined point in time is adapted for pulsing on and pulsing off within the overtravel range.

In another embodiment it is provided that a continuous monitoring is effected as to whether the predefined condition is fulfilled.

In another embodiment a universal component is provided, including an electromechanical switching element, including a plurality of contacts and an armature, wherein the armature is adapted to move the contacts in such a way that they touch each other or become detached from each other, and an integrated measuring technique for determining at least an overtravel range in operation of the electromechanical switching element, and a microcontroller in signal connection with the electromechanical switching element, in which the method is implemented as a software program.

In another embodiment it is provided that the universal component is formed as a relay socket.

Further features and advantages of the solution can be taken from the following description of exemplary embodiments of the solution, with reference to the Figures of the drawing which shows details of the solution, and from the claims. The individual features can each be realized in a variant of the solution individually one by one or in groups in any combination.

In the following description of Figures identical elements or functions are provided with the same reference numerals.

The proposed method is used in products with electromechanical switching elements 10 which include a plurality of contacts 7*a*, 7*b*, 7*c* and an armature 5. In particular, electromechanical switching elements 10 of the proposed solution are incorporated in universal components such as universal sockets, which are used e.g. in the industrial automation (DC industrial networks), or also in charging stations for electric vehicles, etc. The electromechanical switching elements 10 used here in general cannot be configured directly after the production or based on one or more reference components, as depending on the implementation scenario, i.e. type of switching element, control voltage, installation position, installation site etc., different influences become effective, which can lead to changed properties of the switching characteristics of the switching element.

Therefore, according to the solution an actuation of an electromechanical switching element 10 is performed for error reduction directly at the installation site. This means that the method for actuation is carried out within the universal component. For this purpose, both a measuring technique and a microcontroller are necessary and incorporated in the universal component. The universal component can be configured as a relay socket.

In the following, reference merely is made to a relay 10 as an electromechanical switching element 10. However, the method can also be used for other electromechanical switching elements, e.g. contactors. Beside the embodiment shown here, in which a changeover contact forms part of an electromechanical switching element 10, the generic changeover contact can, however, also be integrated in other devices such as a changeover switch.

FIG. 1 shows a schematic representation of a three-pole changeover contact according to a general embodiment. In the present case, the changeover contact merely by way of example forms part of an electromechanical switching element 10 or changeover relay. The electromechanical switching element 10 comprises three terminals associated to the changeover contact, which in the following according to the usual convention are referred to as COM terminal ("common") 2*a*, NC terminal 2*b* (normally closed) and NO terminal 2*c* (normally open). Furthermore, the electromechanical switching element 10 comprises two relay coil terminals 3*a* and 3*b*, via which a relay coil 3, briefly also referred to as coil 3, of the electromechanical switching element 10 can be supplied with a coil current I3. Via the current flow a magnetic field is built up by the relay coil 3, which is guided in a magnetic core 4 and exerts a force on a movable relay armature 5, briefly also referred to as armature 5, which in turn via a slide 6 causes a movement of one or more contacts 7*a*, 7*b*, 7*c* (also referred to as contact elements or contact pills) associated to the respective terminals 2*a*, 2*b*, 2*c*.

Figure 2:
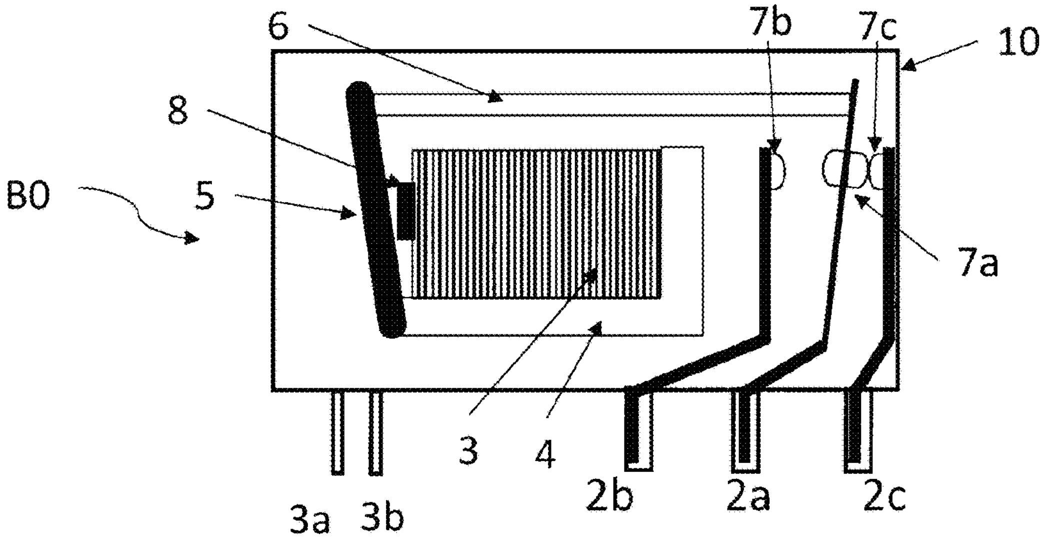
Figure 3:
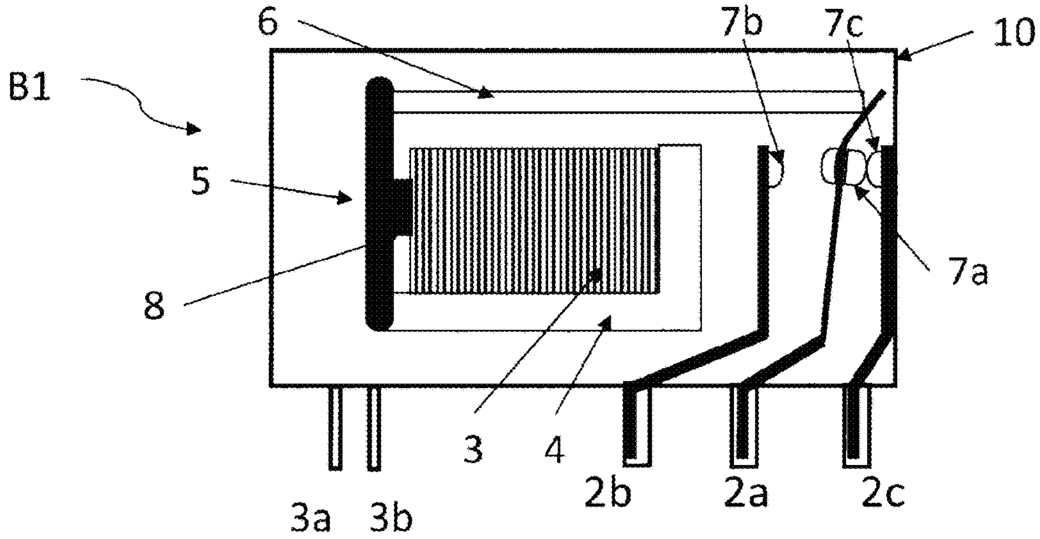

FIG. 1 shows a state in which the relay 10 is open, i.e. contacts 7*a* and 7*b* rest against each other. FIG. 2 shows a state in which the relay is closed, i.e. contacts 7*a* and 7*c* rest against each other. In FIG. 3, a so-called overtravel is shown. The contact 7*a* here rests against contact 7*c* (relay 10 is closed) and is pressed against contact 7*c* by the slide 6 actuated by the armature 5, which is shown by the bend of the upper end of contact 7*a*. Both at switch-on and at switch-off the relay 10 there is obtained a region in which the contacts 7*a* and 7*c* touch each other, but the armature 5 does not touch the coil 3 (more exactly the iron core 8). This means that the connection of the contacts 7*a* and 7*c* already is conductive, but the bend of the contact elements still changes, and this region subsequently is referred to as overtravel range.

Figure 4:
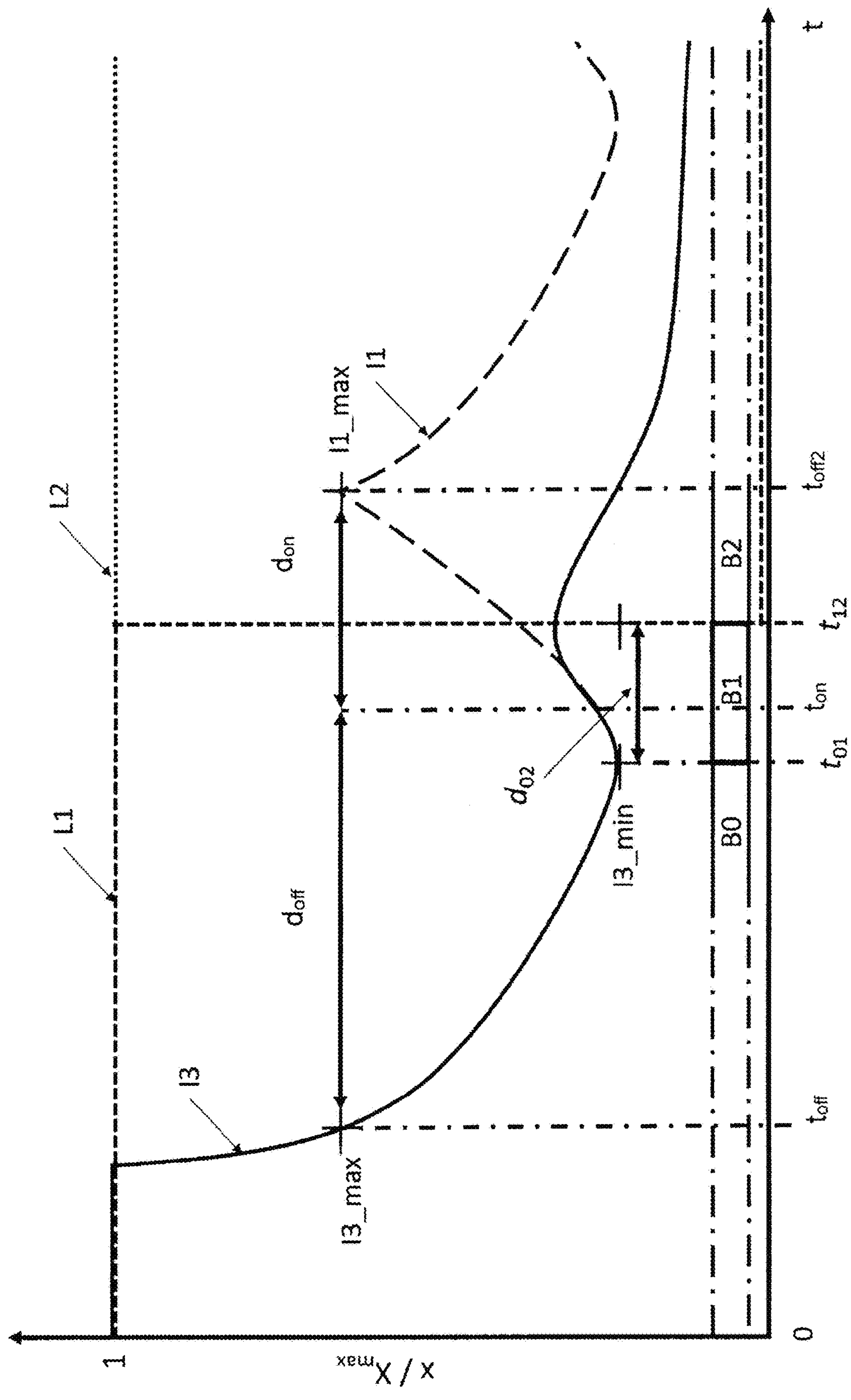
FIG. 4 shows a diagram with a normal switch-off process and rubbing of the contacts according to an embodiment of the present solution.

FIG. 4 shows a time course of a switch-off process for an electromechanical switching element 10 formed e.g. as a relay according to the prior art. On the ordinate, a normalized measurement quantity x/X_max is indicated. The region B0 designates the state in which the relay 10 is closed, i.e. the armature 5 is attracted to the coil 3, more exactly the armature does not touch the coil 3, but the yoke or iron core 8 and becomes detached from the same in the regions B1 and B2, and the contacts 7*a* and 7*c* rest against each other (like in FIG. 2), so that a conductivity exists (designated with the short-dashed line L1). The region B1 designates the state of the overtravel (like in FIG. 3) at which the armature 5 is detached from the coil 3, but the contacts 7*a*, 7*c* are not yet detached from each other. The region B2 shows the state in which the relay 10 is open, i.e. the contacts 7*a*, 7*c* are detached from each other so that no more conductivity exists between the contacts 7*a*, 7*c* (like in FIG. 1). The continuous line represents the coil current I3. It can be seen that in the switch-off process the coil current I3 decreases to a current minimum (minimum current) at the time t_01. This current minimum is defined by the detachment of the armature 5 from the iron core 8 of the coil 2 (and can be detected shortly after the detachment). At the time t_01, at which the armature 5 begins to detach, the coil current I3 rises again, which can be determined e.g. by calculation via the derivative (change from negative to positive). At this time t_01 the region B0 transitions into the region B1 (overtravel). At the time t_12, at which the contacts 7*a*, 7*c* open, the overtravel range B1 is left (region B2 in which the contacts 7*a*, 7*c* are open). The period d_02 designates the time interval between t_01 and t_12, in which the armature 5 is detached from the iron core 8 of the coil 3, but the contacts 7*a*, 7*c* still rest against each other.

It is the objective of the solution to detect a faulty switching state which prevents a detachment of the contacts 7*a*/7*b* or 7*a*/7*c* from each other or in which the contacts 7*a*/7*b* or 7*a*/7*c* touch each other, but do not conduct, and to automatically correct this faulty switching state. This is achieved by a renewed excitation of the armature 5 within the overtravel range B1, whereby the contacts 7*a*, 7*c* are moved and rub against each other, as will be described below. There is in particular observed the switch-off process, i.e. contacts 7*a*, 7*c*. However, the proposed method can also be applied at switch-on. Depending on the installation the changer has two switch-off errors (NO 2*c*-COM 2*a*; COM 2*a*-NC 2*b*), but also switch-on errors for these contact pairs, so that at total of four errors are corrected in the changeover relay: Contacts NO 2*c*-COM 2*a* do not become detached, NO 2*c*-COM 2*a* do not conduct, COM 2*a*-NC 2*b* do not become detached, COM 2*a*-NC 2*b* do not conduct. As in the following reference is made to the switch-off process, the method will also be described only with reference to the contacts 7*a*, 7*c*. The corresponding parameters, e.g. I1, t_on, d_on, L2 are additionally indicated in FIG. 4 in order to illustrate the mode of action of the method.

Excitation, in this embodiment renewed switching-on or pulsing-on (as no complete switch-on process is carried out), is effected at a time t_on within the overtravel range B1, i.e. within the period d_02. Advantageously, the time t_on is chosen such that it lies at a (temporal) distance to t_01 and t_12. Choosing the time t_on can be effected arbitrarily by a microcontroller. From this time t_on the coil current, subsequently referred to as I1, rises again (in FIG. 4 represented as dashed line from t_on), whereby the contacts 7*a*, 7*c* are prevented from becoming detached. However, they nevertheless experience an excitation within the overtravel range and are moved away from each other on different trajectories by the spring force, so that the contacts rub against each other or forces are exerted on a connection of the contacts. While the coil current I1 rises again, the contacts 7*a*, 7*c* are again pressed against each other. When the coil current I1 reaches a predefined current value, which has been chosen in the switch-off process at a time t_off, renewed switching off is effected, whereby the contacts 7*a*, 7*c* again experience an excitation and are moved away from each other on different trajectories by the spring force, so that the contacts rub against each other, or forces are exerted on a connection of the contacts. This can be repeated several times. Thus, rubbing of the contacts 7*a*, 7*c* is generated without the same becoming detached from each other, i.e. without passing through a complete switching cycle. Hence, the switching element 10 also is fully conductive during the rubbing of the contacts. The coil current I3 (I1) hence oscillates between a (predefined, freely chosen) maximum current and a minimum current (defined by the detachment of the armature 5), whereby there is always caused a movement of the armature 5 in the overtravel range B1.

The time t_off of switching off is chosen somewhere between the maximum current (maximum coil current I3) designated with "1" on the ordinate and the minimum current (which is present at the time t_01). In this embodiment, the time t_off is chosen at about ⅔ of the full coil current I3. However, depending on the actuation another switch-off time t_off and hence another switch-off coil current I3 can be chosen. For example, excitation can be effected in a band of 90% to 40% of the coil current I3.

The switch-off duration d_off results from the chosen time t_off and the switch-on time t_on. The switch-on duration d_on results from the period between the switch-on time t_on and the time t_off2, at which the coil current I1 reaches the same height as the switch-off coil current I3 at the time t_off. From the sum of d_off and d_on the frequency of the (pulse width) signal for actuation is obtained, and from the ratio of d_off and d_on the duty cycle of the signal is obtained. There is preferably reached a high frequency of 50 Hz or more, in this embodiment of 200 Hz.

The method advantageously is terminated at the earliest when a successful contacting of the contacts 7*a*, 7*b* (at switch-on) or a detachment of the contacts 7*a*, 7*c* (at switch-off) is detected. Monitoring advantageously is effected continuously or at predefined points in time. When no corresponding detection is possible after a predefined period, the relay 10 is switched off and an error signal is output.

The result of the proposed renewed excitation hence is that the contacts 7*a*, 7*c* repeatedly rub against each other, but are not opened (separated from each other) in the process, so that the conductive connection therebetween remains, as indicated by the dotted line L2 in FIG. 4. The term repeatedly means that pulsing on and off (in the switch-off process) or pulsing off and on (in the switch-on process) is repeated several times, preferably until the error state no longer is detected, wherein a limitation to a duration or frequency of rubbing can be provided.

Moreover, no complete switching cycle is passed through during the excitation. Rather, a renewed excitation is effected within the overtravel range B1, i.e. within the period d_02 between detachment of the armature 5 and detachment of the contacts 7*a*, 7*c* at a time t_on, i.e. yet before the contacts 7*a*, 7*c* become detached from each other.

The method is event-based and advantageously is carried out when an error state has been detected, i.e. when the contacts 7*a*, 7*c* do not become detached or a conductive connection no longer can be produced due to deposits. Due to the rubbing resulting from the repeated pulsing on and pulsing off (in the switch-off process) or the pulsing off and pulsing on (in the switch-on process) impurities between the contacts are detached or material applied is rubbed off.

However, the method can also be carried out under a condition other than a currently detected error state, e.g. preventively. It can be carried out due to a detection of an emerging error state, i.e. preventively. In the event that e.g. an oscillation in the coil current I3 is detected at the end of a switching operation, it can be inferred that the switching element 10 is in a degradation state (deterioration of the contact quality of the contacts 7*a*, 7*b*, 7*c*). An error state, at which the contacts 7*a*, 7*c* no longer become detached from each other (at switch-off of the relay 10) or do not produce a conductive connection (at switch-on of the relay 10), has not yet been detected, but the error state already is apparent, i.e. is expected. The method then can be carried out preventively.

Moreover, in a less preferred embodiment the method can be carried out preventively after a firmly predefined number of switching operations of the relay 10.

As mentioned already, the method can be carried out both in the switch-on process and in the switch-off process, as in both processes the error state can occur, so that the contacts 7*a*/7*c*, 7*a*/7*b* do not become detached from each other or do not conduct.

To allow the method to be carried out, data (coil current I3, times t) are collected at the beginning of the use of the electromechanical switching element 10, i.e. after installation of the application, during each switching operation, in order to be able to determine the overtravel range B1. As already described above, the same can be determined from the temporal difference between the first sign change of the temporal derivative of the coil current and the first change of the conductivity of the contacts 7*a*/7*c*, 7*a*/7*b*. By collecting the data for every switching operation, if possible, an adaptation of the overtravel range B1 thus can be effected, which e.g. due to the ageing of the relay 10 can become shifted during the service life. The method hence is adaptive.

To collect the data and carry out the adaptation, a universal component is provided, which includes both the required measuring technique e.g. for current measurement and a microcontroller which can carry out the corresponding calculations and performs the actuation of the relay 10. In the microcontroller the method is implemented as a software program. It also serves for actuating the relay 10 e.g. by means of a PWM signal.

It is an advantage of the method that a multitude of the failures of the systems due to faulty relays 10 can be prevented. In addition, the system has a short reaction time, whereby the operation of systems can be continued without interruption. Another advantage of the method consists in that the rubbing can be terminated immediately when no renewed switch-on is effected, as there is no oscillation behavior. Moreover, the technical realization as an autarkic universal switching component ensures a minimum application effort of the users.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

2*a* COM terminal
2*b* NC terminal
2*c* NO terminal
3 relay coil
3*a*, 3*b* relay coil terminals
4 magnetic core
5 relay armature
6 slide
7*a*-7*c* contact elements
8 iron core
10 electromechanical switching element, e.g. relay
B0 armature position contacts closed
B1 armature position overtravel (overtravel range)
B2 armature position contacts open
I3 coil current
I1 coil current when rubbing
I3_max, I1_max maximum value coil current
I3_min minimum value coil current
L1, L2 conductivity
t time
t_off switch-off time
t_off2 switch-off time rubbing
t_on switch-on time
t_12 time at which contacts open
t_01 time at which armature becomes detached
d_02 period/duration overtravel
d_off switch-off duration
d_on switch-on duration

The invention claimed is:

1. A method for actuating an electromechanical switching element including a plurality of contacts, a coil with an iron core, and an armature, the method comprising:
in the event that a predefined condition is fulfilled,
in a switch-off process pulsing on and off or in the switch-on process pulsing off and on of the switching element is carried out repeatedly at a predefined time within an overtravel range such that a coil current flowing into the coil oscillates between a predefined maximum value and a minimum value so that the armature moves within the overtravel range and the plurality of contacts thereby rub against each other without becoming detached from each other,
wherein the minimum value is defined as a current value at a time at which the armature begins to detach from the iron core.

2. The method of claim 1, wherein the predefined condition is a detected error state in which the contacts do not contact each other at switch-on or do not become detached at switch-off, or
wherein the predefined condition is a detection of a deterioration of the contact quality of the contacts.

3. The method claim 1, wherein a switch-on duration or a switch-off duration is chosen so long until the coil current has reached a value which the coil current had at a predefined point in time after switch-off or switch-on.

4. The method of claim 1, wherein for each electromechanical switching element the overtravel range is determined continuously during use, and
wherein, in the event that the same changes during a service life, the predefined point in time is adapted for pulsing on and pulsing off within the overtravel range.

5. The method of claim 1, wherein a continuous monitoring is effected as to whether the predefined condition is fulfilled.

6. A universal component, comprising:
an electromechanical switching element, including a plurality of contacts and an armature, the armature being adapted to move the plurality contacts such that they touch each other or become detached from each other;
an integrated measuring technique for determining at least one overtravel range in operation of the electromechanical switching element; and
a microcontroller in signal connection with the electromechanical switching element, in which the method of claim 1 is implemented as a software program.

7. The universal component of claim 6, wherein the universal component comprises a relay socket.

* * * * *